Patented July 25, 1933

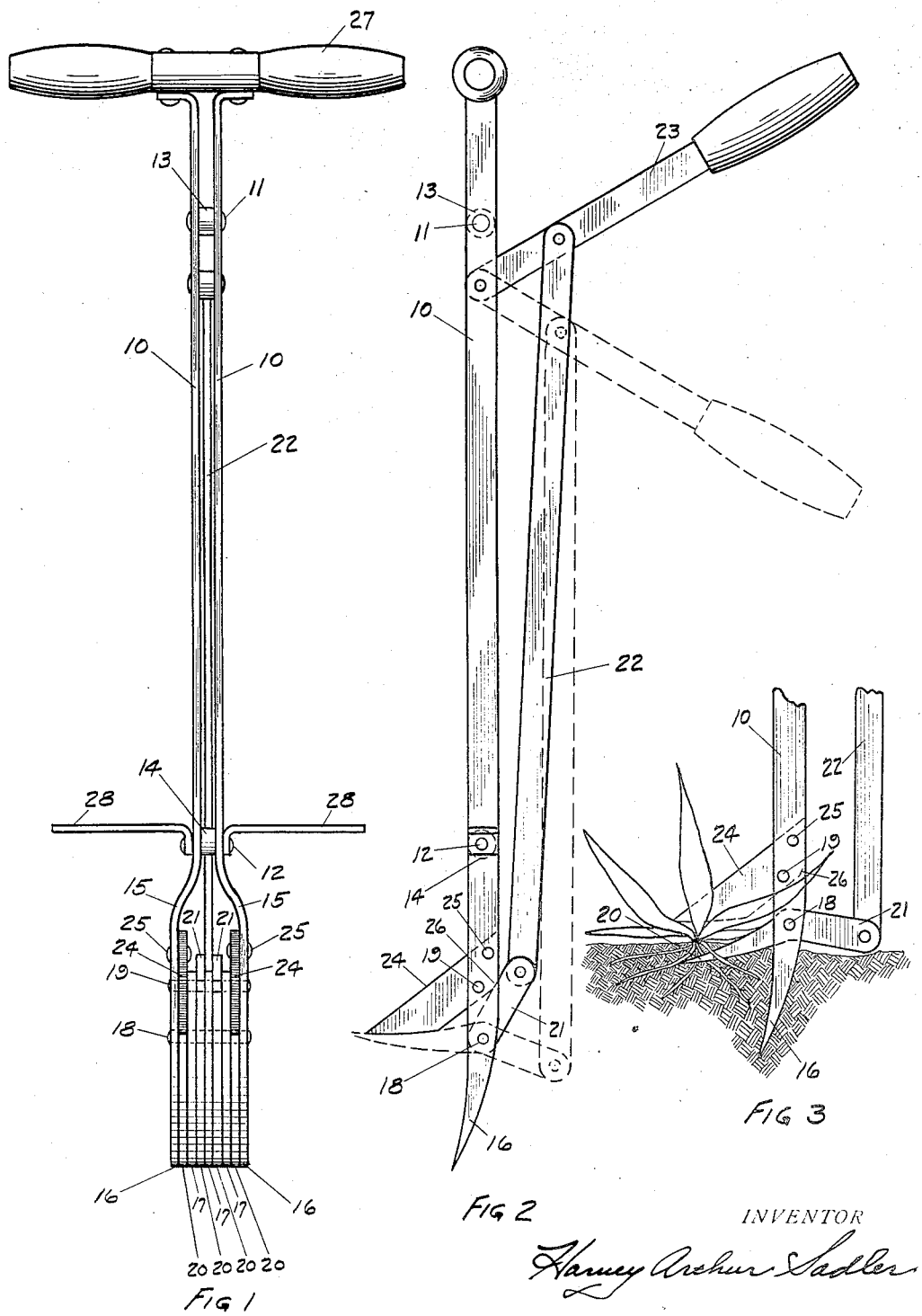

1,919,396

UNITED STATES PATENT OFFICE

HARVEY ARTHUR SADLER, OF CUYAHOGA FALLS, OHIO

MACHINE FOR PULLING PLANTS

Application filed June 4, 1931. Serial No. 542,005.

The object of the invention, is to provide a device for pulling plants, that operates with a minimum of disturbance to the soil, and is convenient to operate, to pull the plant and dispose of it, without the operator soiling hands or clothes. Another object is to allow the operator to remain in an erect and natural position, not requiring the operator to stoop or kneel as when using most devices heretofore designed for this purpose.

The invention is particularly useful for the pulling of weeds and roots from lawns and gardens, however, it is very adaptable for many other uses.

The accompanying drawing shows a preferred form of the invention.

Figure 1 is a front elevation.

Figure 2 is a side elevation.

Figure 3 illustrates operation of the device.

The device shown consists of two metallic side members 10, 10, attached together at 11, and 12. Spacers 13, 14, are provided at points of attachments so as to space side members 10, 10, slightly apart. The two side members 10, 10, are divergingly curved at 15, and sharpened to form outer fixed fingers 16, 16. Three additional fixed fingers 17, 17, 17, have the same relative shape as fingers 16, 16, and are rigidly held in alignment with fingers 16, 16, by means of pins 18, 19. Four movable fingers 20, are alternately placed adjacent to fixed members 16, and 17, and have the same contour below pin 18, as the latter, and are bent and extended outwardly above pin 18, as indicated at 21, so as to provide a leverage for actuating fingers 20.

The actuating means for pivoting fingers 20, consists of link 22, and hand lever 23.

Two members 24, 24, are rigidly attached by pin 19, and rivets 25, to the inside of members 10, 10, the lower surface of members 24, 24, is shaped to match and form a stop for fingers 20, at the upper limit of movement of said fingers 20. Members 24, also provide a stop at 26, for levers 21, in such manner that fingers 20, will be held in exact alignment with fixed fingers 16, and 17, at the lower limit of movement of fingers 20. Handle 27, is attached to the upper end of side members 10, 10.

Members 28, 28, are rigidly attached to side members 10, 10, providing convenient means for the operator to force the device into the ground.

In the operation of the device, hand lever 23, is pulled to the upper position, which brings movable fingers 20, into alignment with fixed fingers 16, and 17. The operator then pushes the fingers into the ground adjacent to the plant to be pulled as illustrated in Figure 3. Lever 23, is then pushed to the lower position which causes fingers 20 to revolve upwardly, which loosens the plant from the soil and grasps the plant between said fingers 20, and members 24, as illustrated in Figure 3. The plant is easily pulled by withdrawing the device from the ground and is carried to a suitable disposal place and released by returning lever 23, to the upward position. Soil which may cling to either the fixed or movable fingers is dislodged when the fingers are brought together in preparation for pulling another plant.

It is understood that this invention is not limited to the exact construction here shown, but may be modified so long as such modification does not depart from the spirit or scope of the appended claims.

I claim:

1. The combination in a plant pulling device of a stem having a plurality of fixed fingers spaced apart, with a pivoted finger between each of the fixed fingers, said pivoted fingers being capable of alignment with the fixed fingers, and means for rotating the pivoted fingers and stationary members coacting with the pivoted fingers to grasp the plant.

2. The combination in a plant pulling device of a stem having sharpened members at the lower end and rotatable members that are sharpened to agree in contour with the former and are capable of rotation upwardly from alignment therewith to lift the plant.

3. The combination in a plant pulling device of a stem having sharpened members at the lower end and rotatable members that are sharpened to agree in contour with the former, and are capable of rotation upwardly from alignment therewith and stationary members coacting with the rotatable members to grasp the plant.

4. The combination in a plant pulling device of a stem having at the lower end a plurality of sharpened fixed and rotatable fingers and means for rotating the latter and members cooperating with the rotatable fingers to grasp the plant when the latter are rotated upwardly.

5. The combination in a plant pulling device of a stem having at the lower end a plurality of sharpened rotatable fingers and means for rotating the said fingers and members cooperating with the rotatable fingers to grasp the plant when the fingers are rotated upwardly.

HARVEY ARTHUR SADLER.